United States Patent [19]

Ullman

[11] Patent Number: 5,787,166
[45] Date of Patent: Jul. 28, 1998

[54] TELEPHONE COMMUNICATION HEADSET

[76] Inventor: Johan Ullman, Johannebergsg. 32B, Göteborg, Sweden, S-412 55

[21] Appl. No.: 648,036

[22] PCT Filed: Nov. 22, 1993

[86] PCT No.: PCT/SE93/01003

§ 371 Date: May 20, 1996

§ 102(e) Date: May 20, 1996

[87] PCT Pub. No.: WO95/15044

PCT Pub. Date: Jun. 1, 1995

[51] Int. Cl.$^6$ ............................................ H04M 1/00
[52] U.S. Cl. ............................................ 379/430
[58] Field of Search ............................. 379/430, 433, 379/428; 381/183, 187, 68–69

[56] References Cited

U.S. PATENT DOCUMENTS 4,893,344  1/1990  Tragardh et al. .
4,972,468  11/1990  Murase et al. ..................... 379/430

FOREIGN PATENT DOCUMENTS 396300  11/1990  European Pat. Off. .

*Primary Examiner*—Jack Chiang
*Attorney, Agent, or Firm*—Lerner, David, Littenberg, Krumholz & Mentlik

[57] ABSTRACT

A telephone communication headset for attachment to the outer ear of an operator and comprising a main unit (3) which supports an arm (2) with a microphone (1) at its outer end, and an earphone (5) on the main unit. Furthermore, a U-shaped support (6) is arranged with a first and a second downwardly-directed shank, said support (6) being attached to the main unit. A connecting upper portion (9) is arranged between the two shanks, which portion is arranged, in a position of use, to rest against the uppermost point of the outer ear, where the outer ear attaches to the scull. A weight (11) is arranged so that its mass and leverage presses the rear shank (10) of the support (6) towards the rear side of the outer ear and into the fold between the outer ear and the skull. The effect of gravity on the microphone (1) and the microphone-arm (2) is also counter-balanced. The telephone headset is hereby held in position by the pressing action of the rear shank and the torque about said suspension point by way of gravity.

7 Claims, 2 Drawing Sheets

TELEPHONE COMMUNICATION HEADSET

TECHNICAL FIELD

The present invention relates to a telephone communication headset comprising an earphone, a microphone, and means for holding the headset by the operator's head.

BACKGROUND OF THE INVENTION

Many people spend a large part of their working day on the telephone. In spite of access to loudspeaker-telephones it is still common practice to hold the receiver against the shoulder when both hands are needed for turning pages etc.

Loudspeaker-telephones do not give an adequate sound quality, which is why they are seldom used for more than making the connection and conference-conversations.

When using the telephone in a car the wind-noise constitutes an additional inconvenience factor during so-called hands-free operation. It is, however, not suitable to hold the receiver by hand, and in certain situations even dangerous, and holding it against the shoulder is even more dangerous or, in many cases, not even possible.

An additional type is represented by telephone receivers which are worn on the head, so-called headsets. A telephone headset is previously known which consists of a U-shaped support extending over the top of the head from one ear to the other. On one of the shanks of the U-shaped support, or sometimes on both, an earphone is positioned, which is pressed against the ear with a flat portion. The U-shaped support additionally carries a microphone arrangement extending forwardly to the operator's mouth. This device enables a firm hold of the apparatus, but nevertheless suffers from a number of inconveniences.

It requires two hands for donning and removal.
It presses against the ears, which creates discomfort.
It makes you feel closed off.
It ruins your hairstyle.
It takes up a great deal of space.
It is difficult to use at the same time as with wearing glasses.
It produces a psychological resistance due to its appearance.
It takes up a lot of space when not in use.

Telephone headsets of this kind are currently used, due to the above inconveniences, predominantly by persons working with telephone communication long working hours and particularly in noisy environments. Nowadays however, telephone communication takes place more and more often simultaneously with other activities, such as driving and customer service, for example in hotel receptions. In such cases, said inconveniences are unacceptable. Particularly in conjunction with customer service it is necessary to have the telephone receiver as un-noticeable as possible, whilst allowing alternating telephone communication and direct calls to another person without requiring handling.

Therefore, another type of headset has been provided, which is worn directly on the ear without any U-shaped head support and which may thereby have a smooth shape and low weight, such that wearing it becomes almost unnoticeable and barely noticeable for bystanders. Telephone receivers and headsets of this type are known from U.S. Pat. No. 4,893,344 (Tragardh et al) and EP.A2,0 396 300 (Scott). These devices, as well as other devices of the same main category require a support by clip-action around one of the operator's ears. The leverage from the microphone-arm of the device is hereby counter-acted, said arm having to be made to a certain length since it is designed to extend from the ear to a position close to the mouth, where its sound-receiving opening should be positioned. This clip-action on the outer ear results in the device having to be provided with an adjustable means, which may have to be handled in each donning-situation and particularly if the headset is transferred between different persons. The contact required for the support may result in discomfort and if, on the other hand, it is too loose, the receiver will have an unsteady support and there is a particular risk of the relatively long microphone-arm rotating downwardly as a result of body-movements, and thus being displaced from its position.

SUMMARY OF THE INVENTION

The telephone headset according to the invention belongs to the second mentioned type of headset. The invention is thereby directed towards eliminating said disadvantages and achieving such a steady support in the position of use, that said position is maintained even when the operator is moving, without resorting to special supporting means. This is achieved according to the invention by a weight-balancing of the headset, such that it strives to maintain its correct position by way of gravity.

BRIEF DESCRIPTION OF THE DRAWINGS

An embodiment of the invention will now be described, as illustrated in the accompanying drawings, in which.

DESCRIPTION OF THE PREFERRED EMBODIMENT

Figure 1:
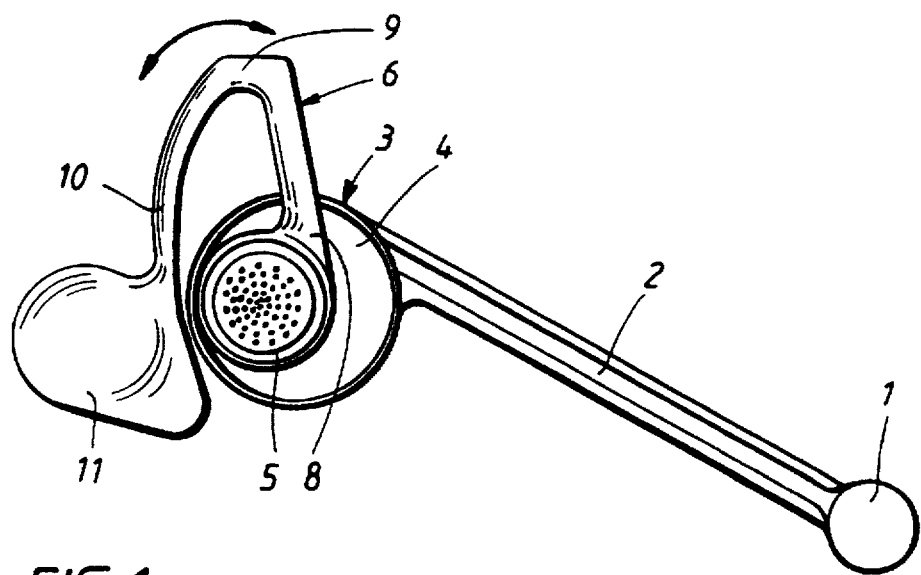
FIG. 1 shows the headset in a side view from its inside.
Figure 2:
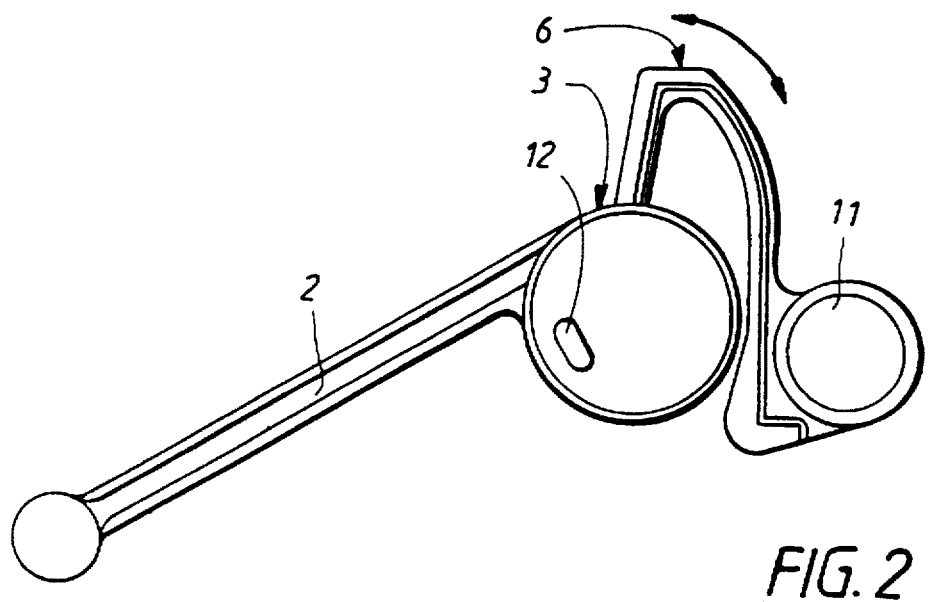
FIG. 2 shows a side view from its outside.

With reference to the figures, the active part of the telephone headset comprises a microphone 1 with an arm 2, supporting the same on a main unit 3. Said main unit comprises a housing 4 with an earphone 5 and a U-shaped support 6 journalled in said housing.

Figure 3:
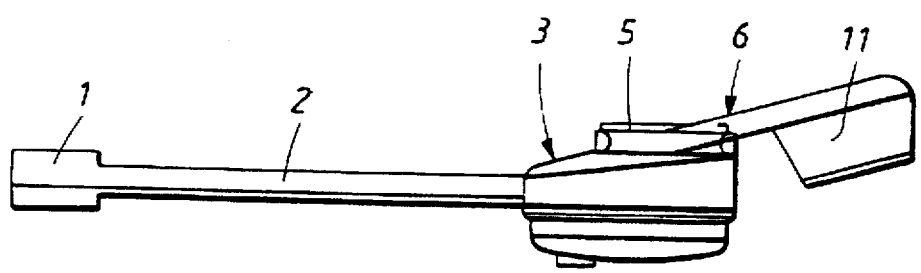
FIG. 3 shows a view from above.

The microphone-arm 2 extends from the forwardly facing edge of the housing 4 in a position of use. The centre of the journalling which renders the support rotatable relative to the housing, is displaced towards the rear edge of the housing. In the embodiment, the circular earphone 5 is utilized for journalling the U-shaped support 6, which support encloses the earphone with an inner portion 8. From said inner portion, there extends a U-shaped portion 9 which, at its outer end 10, is terminated in an outwardly protruding casing 11 (as seen in FIG. 3) for an inserted counter-weight of a heavy material. As can be seen further in FIG. 3, the portion 9 of the support is angled inwardly relative to the axial main plane of the main unit 3.

In FIG. 3, it can be seen that the main unit 3 with its outer surface forms a complete casing. A control button 12 is however positioned in this casing.

The embodiment shown in the figures is intended to operate in a wireless manner. Thus, it will- be connected, via a radio linkage, to a stationary or mobile telephone device of some kind, by means of which communication may be maintained with a telephone network. The device must also be provided with means for selecting a number to a desired receiver in external communication. The design of such main units for wireless telephones are well known in the art and will not be described in more detail here. It should however be added that it is sometimes preferred to control the telephone unit by way of voice control, in certain installations, instead of using a keyboard or the like for selecting a number. Said voice control is also covered by the invention. If another wireless communication, other than with radio waves, is to be used, for example by transmittal with infra-light, the telephone will of course be adapted accordingly, which is well known practice. It is by no means excluded that the headset is connected with a cable to the main unit, but some of the freedom and comfort that the headset according to the invention offers, will hereby be lost.

The main unit 3 is used not only as a support for the microphone-arm, the earphone and the U-shaped support) but also as an apparatus casing for the electrical/electronic equipment in the headset. In a wireless embodiment, this consists of a transmitter which receives signals from the microphone 1 via a conduit extending in the arm 2, and a receiver which is in contact with the earphone 5. The microphone conduit may thereby constitute an antenna and a second antenna-branch (ground) may be positioned in the U-shaped support 6 and, if needed, be connected to the counter-weight in the casing 10. Additionally, means may be arranged for interference elimination, automatic sound-control etc. Finally, the casing must also contain a battery for power supply.

Certain parts of the necessary equipment may alternatively be placed in the U-shaped support and preferably in such a way that they constitute a part of the mass of the counter-weight by being placed in the casing 11. The battery is particularly suitable for this purpose.

The button 12 on the outside of the casing is pre-supposed to be connected for switching the device on and off. Alternatively, other means may be arranged for this purpose. For example, the turning of the U-shaped support 6 between different positions may be used for this control.

Figure 4:
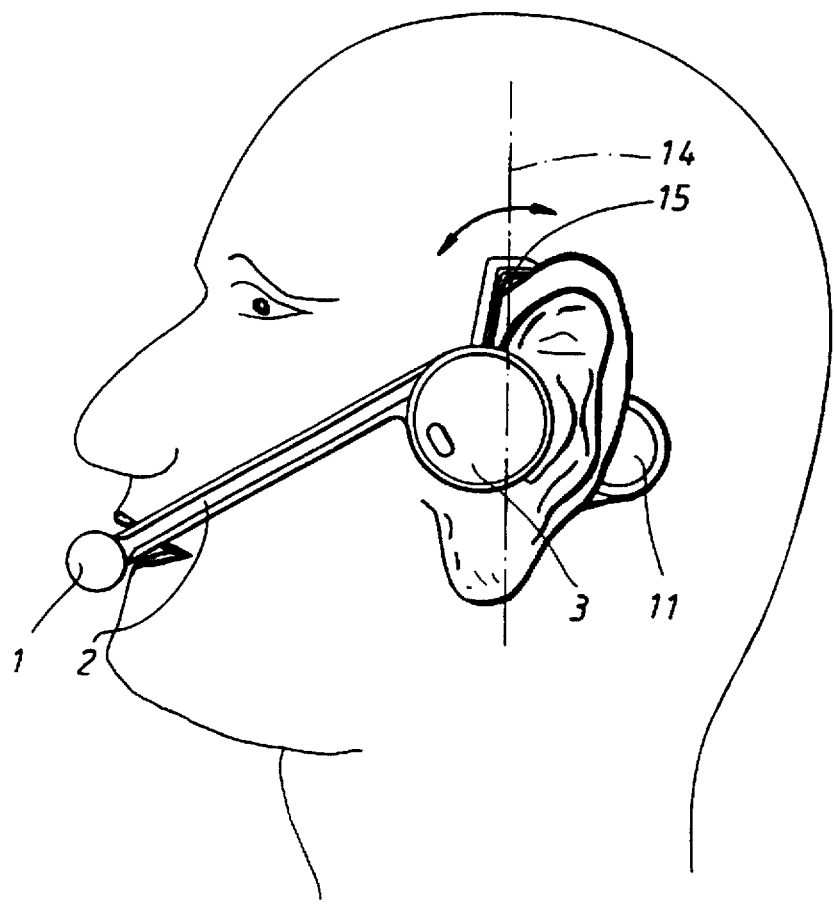
FIG. 4 shows the headset on an operator's head as seen in a side view.

FIG. 4 showns how the device according to the invention is intended to be suspended by way of the U-shaped support 6 on the operator's ear. In the figure, the vertical line through the ear on this intended operator is indicated by the line 14, said line extending through the uppermost point, denoted 15, where the outer ear is attached to the skull. This means that the U-shaped support 6 will be situated closely adjacent the skull and thus on the inside of the earphone. The device is balanced in such a way by means of the counter-weight, that the centre of mass of the headset is on or preferably behind said vertical line 14 through the point 15, so that it is held in place by gravity alone when the head is in its normal upright position, which it usually is when the operator is sitting or standing up.

In this position, the headset is supported by the head of the operator, so that the microphone 1 is held in place close to the mouth and the earphone 5 is held in place close to the ear.

The masses of the device, which are substantially represented by the microphone 1 and its arm 2, the main unit 3 with the earphone 5 and the counter-weight on the U-shaped support 6, are distributed in such a way that the centre of mass of the device in the longitudinal plane (horizontally in a position of use and substantially parallel to the sagittal plane of the operator) is positioned on or behind the vertical line 14 extending though said uppermost point 15, where the outer ear is attached to the skull, and laterally in the frontal plane relative to said line and outside of the abutment surface of the U-shaped support, in such a way that the effect of the gravitational force on the device will press it inwardly towards the head and at the same time against the rear side of the ear and into the fold between the rear portion of the outer ear and the skull of the operator. It is important that the U-shaped support is shaped for this position; as shown, it is relatively thin (see FIG. 3). A wedge-shape may, however, also be advantageous.

As shown, the headset according to the invention is held in position mainly by the effects of gravitational forces, which are given such a distribution and have such directions that a correct position may be maintained without the use of clip devices. This is achieved, on the one hand, by said counter-weight, having a mass and a position such that it strives to turn the entire device in a clock-wise direction (as seen in FIG. 4), around said resting point 15 against the uppermost connection between the outer ear and the skull. This results in the microphone-arm being held in the desired angle with the microphone close to the mouth of the operator and in the end-portion of the U-shaped support with the counter-weight being pressed against the rear side of the outer ear and into the fold between the ear and the skull. By suitable adaptation of this pressure point as well as of the abutment surfaces (mainly the casing of the counter-weight) a very secure holding action may be achieved. It may be added that the tissue in the fold behind the ear is relatively hard and not particularly sensitive to pressure.

In the embodiment, the weight is placed on the rear shank 10 of the U-shaped support. This is advantageous since it is said shank 10 that will be used to relieve said stress due to the weight. It is however possible to place the weight, i.e. the weight of the shank, in some other part behind the suspension point 15. This part of the headset must thereby be connected to the shank for effecting said gravitational influence.

As mentioned, the U-shaped support is rotatable about the receiver in the embodiment. In this way, the entire device may, after suspension on the ear, be rotated about the fixed point represented by the U-shaped support, so that a microphone position is obtained, which is suitably adapted to the physiognomy of the operator. The rotatability of the U-shaped support is thus not intended to provide a clip-action, since such a clip-action is, as mentioned, not necessary.

With wire-transmittal, the wire needed for communication with the connected equipment will be attached in a manner such that its weight is utilized for determining the centre of mass of the device, for example by having it attached to the device laterally from the outside and it will also, by means of its stiffness, act as a lever with its most proximal portion.

By making the device attachable on a telephone or a radio receiver-set, one may vary between using it as a headset and using the entire system as an ordinary telephone receiver.

If the device communicates wirelessly with other equipment, it is unnecessary to wear, or bring, other equipment. It may, however, also be made to communicate wirelessly with other body-worn equipment.

Its batteries may for instance be of the kind that are inductively rechargeable or rechargeable via contact with other equipment.

It may be provided with a microphone having a directional effect for decreasing the need for length of the microphone arm and decreasing the risk of consecutive working.

I claim:

1. A telephone communication headset for donning on an outer ear of a user comprising:

a. a main unit;

b. an arm supported by said main unit, said arm having a sound receiving opening for a microphone, said opening being positioned substantially at the outer end of said arm, remote from said main unit;

c. an earphone on or adjacent said main unit;

d. a substantially U-shape support comprising a first shank, downwardly directed in a position of use, and attached to said main unit; a second shank, downwardly directed and occupying an opposing position to said arm relative to said main unit; and an upper portion connecting said first shank and said second shank, said upper portion being arranged, in a position of use, to rest against the uppermost point of the user's outer ear, wherein said upper portion is shaped to support said headset by resting mainly against the uppermost point of the outer ear where it joins the fold to the user's skull; and e. a weight, attached to said support and arranged such that said weight's mass and leverage is adapted, at least in an upright position of the user's head, to press said second shank against the rear side of the outer ear substantially near the fold between the outer ear and the skull, by way of gravity, whereby by balancing the leverage from the effect of gravity on said arm, said headset is held in position by said pressing of said second shank and by the torque effected by gravity about said uppermost point of the outer ear where it joins the fold to the skull.

2. The headset of claim 1, wherein said weight is placed outside the inner surface of said support such that, in a position of use, an abutment surface is formed against the skull such that said surface of said support is pressed inwardly against the skull by an inwardly-turning leverage effected by said weight.

3. The headset of claim 1, wherein said weight is substantially supported by said second shank.

4. The headset of claim 1, wherein said second shank is shaped and dimensioned so as to occupy a position within the fold between the rearwardly facing surface of the outer ear and the opposing surface of the skull.

5. The headset of claim 1, wherein said main unit is shaped so as to form a casing for enclosing objects.

6. The headset of claim 1, wherein the main plane of said support is turned inwardly in a direction towards a side of said headset which is intended to be turned inwardly against the user's head relative to a main plane through said arm.

7. The headset of claim 1, wherein said support is rotatable relative to said main unit about an axis substantially perpendicular to the main plane of said support, such that said main unit and arm may be rotated about a fixed element which is formed by said support on its attachment on the ear, so that the position of said arm relative to the user's mouth may be adjusted.

* * * * *